United States Patent
Garney

(10) Patent No.: US 10,798,145 B1
(45) Date of Patent: Oct. 6, 2020

(54) ANALYZING DATA STREAMS

(71) Applicant: Benjamin J. Garney, Eugene, OR (US)

(72) Inventor: Benjamin J. Garney, Eugene, OR (US)

(\*) Notice: Subject to any disclaimer, the term of this patent is extended or adjusted under 35 U.S.C. 154(b) by 258 days.

(21) Appl. No.: 15/963,018

(22) Filed: Apr. 25, 2018

Related U.S. Application Data

(60) Provisional application No. 62/489,986, filed on Apr. 25, 2017.

(51) Int. Cl.
*G06F 15/173* (2006.01)
*H04L 29/06* (2006.01)
*H04N 21/234* (2011.01)
*H04L 12/26* (2006.01)
*G06F 15/16* (2006.01)

(52) U.S. Cl.
CPC .......... *H04L 65/80* (2013.01); *H04L 43/0852* (2013.01); *H04L 65/60* (2013.01); *H04L 69/22* (2013.01); *H04N 21/234* (2013.01)

(58) Field of Classification Search
CPC ............... F24F 13/28; F24F 2003/1614; F24F 2003/1657; F24F 3/1603; H04L 65/608; H04L 65/60; H04L 29/06476
USPC ........................................................ 709/224
See application file for complete search history.

(56) References Cited

U.S. PATENT DOCUMENTS

| | | | |
|---|---|---|---|
| 5,521,927 A | 5/1996 | Kim et al. | |
| 6,226,291 B1 | 5/2001 | Chauvel et al. | |
| 7,376,692 B2 | 5/2008 | Kovacevic et al. | |
| 7,724,682 B2 | 5/2010 | Kovacevic | |
| 7,724,818 B2 | 5/2010 | Hannuksela et al. | |
| 9,344,362 B2 | 5/2016 | Suh et al. | |
| 2011/0261202 A1\* | 10/2011 | Goldstein | G08B 13/19602 348/149 |
| 2012/0170761 A1\* | 7/2012 | Ozawa | H04L 43/028 381/56 |
| 2012/0179742 A1\* | 7/2012 | Acharya | H04N 7/18 709/202 |
| 2013/0114742 A1\* | 5/2013 | Hannuksela | H04N 19/58 375/240.25 |
| 2013/0305060 A9\* | 11/2013 | Resch | H04L 12/00 713/193 |
| 2014/0067679 A1\* | 3/2014 | O'Reilly | G06Q 20/40145 705/44 |

(Continued)

OTHER PUBLICATIONS

ATSC Standard: Digital Audio Compression (AC-3, E-AC-3), Doc. A/52:2015, Nov. 24, 2015, 271 pgs.

*Primary Examiner* — Karen C Tang
(74) *Attorney, Agent, or Firm* — Miller Nash Graham & Dunn LLP

(57) ABSTRACT

Described herein are processes to evaluate data streams, for example, to a process and system for verifying whether streaming data content satisfies pre-determined parameter rules. Such rules may be dynamic. User parameters may specify particular parameters to be included in the verification process. For example, a user may use disclosed embodiments to ensure that a particular video stream will play on one or more particular video players. If the content will not play properly, embodiments of the invention provide information to the user and may make suggestions regarding recommended steps to properly qualify the stream. In other embodiments warnings or other alerts are generated and provided to the user.

18 Claims, 7 Drawing Sheets

Parse Graph

Graph Annotations

(56) References Cited

U.S. PATENT DOCUMENTS

| | | | | |
|---|---|---|---|---|
| 2014/0359036 | A1* | 12/2014 | Blakers | H04L 51/34 709/206 |
| 2015/0095420 | A1* | 4/2015 | Haun | H04L 65/403 709/204 |
| 2016/0127440 | A1* | 5/2016 | Gordon | H04L 65/601 709/219 |
| 2016/0381110 | A1* | 12/2016 | Barnett | H04L 65/601 709/231 |
| 2017/0006135 | A1* | 1/2017 | Siebel | G06F 8/10 |
| 2017/0094018 | A1* | 3/2017 | Ekstrom | H04W 8/16 |
| 2017/0102933 | A1* | 4/2017 | Vora | G06F 8/65 |
| 2017/0139771 | A1* | 5/2017 | Chung | G06F 11/1068 |
| 2017/0147417 | A1* | 5/2017 | Sasturkar | H04L 41/0816 |
| 2017/0230211 | A1* | 8/2017 | Teflian | H04Q 9/02 |
| 2017/0289240 | A1* | 10/2017 | Ghare | H04L 65/4069 |
| 2017/0308457 | A1* | 10/2017 | Barsness | G06F 8/436 |
| 2018/0020045 | A1* | 1/2018 | Cook | G06F 8/30 |
| 2018/0139108 | A1* | 5/2018 | Fulton | G06F 8/65 |
| 2018/0286035 | A1* | 10/2018 | Kozicki | G07D 7/2033 |
| 2018/0292992 | A1* | 10/2018 | Kachare | G06F 11/3409 |
| 2018/0293258 | A1* | 10/2018 | Oravivattanakul | G06F 9/542 |
| 2019/0179973 | A1* | 6/2019 | Wegner | G06F 3/1288 |
| 2019/0385057 | A1* | 12/2019 | Litichever | G06N 3/08 |

* cited by examiner

ANALYZING DATA STREAMS

CROSS-REFERENCE TO RELATED APPLICATIONS

This patent application claims benefit from U.S. Provisional Patent Application No. 62/489,986 filed Apr. 25, 2018, entitled "ANALYZING VIDEO STREAMS," the disclosure of which is incorporated herein by reference in its entirety.

BACKGROUND

The success of internet video has created a vast ecosystem of encoders, packagers, hosting providers, and players. These systems do not work together perfectly, and as a result, users experience problems such as corruption of audio or video, skips in playback or even unplayable content. Due to the complexity of the standards involved in the video ecosystems, the same content can be encoded and played in many different ways. Further, due to the complexity of the systems that deliver video, even correctly encoded video streams might not play properly in practice. For example, some video streams, while technically satisfying particular data specifications, still produced errors during playback. In summary, there is no widely accepted process to ensure error-free playback of video in every case. Embodiments of the disclosure address this and other limitations of the prior art.

BRIEF SUMMARY OF THE DISCLOSURE

Embodiments of the invention include a utility for fetching data streams from content servers and storing a detailed download record of the download process, a utility for performing detailed analysis of video, audio, or other content captured by the fetcher, and a utility for replaying downloaded content. Other embodiments include some of these components individually. These utilities collectively produce an analysis, based on identifying alerts, that may be presented to the user to aid them in producing streams that will play properly on multiple systems.

DETAILED DESCRIPTION

Embodiments of the invention are directed to a process and system for verifying whether streaming data content satisfies pre-determined parameter rules, which may be dynamic. Further, embodiments may receive user parameters to be included in the verification process. For example, a user may use embodiments of the invention to ensure that a particular video stream will play on one or more particular video players. If the content will not play properly, embodiments of the invention provide information to the user and may make suggestions regarding recommended steps to properly qualify the stream. In other embodiments warnings or other alerts are generated and provided to the user.

Figure 1:
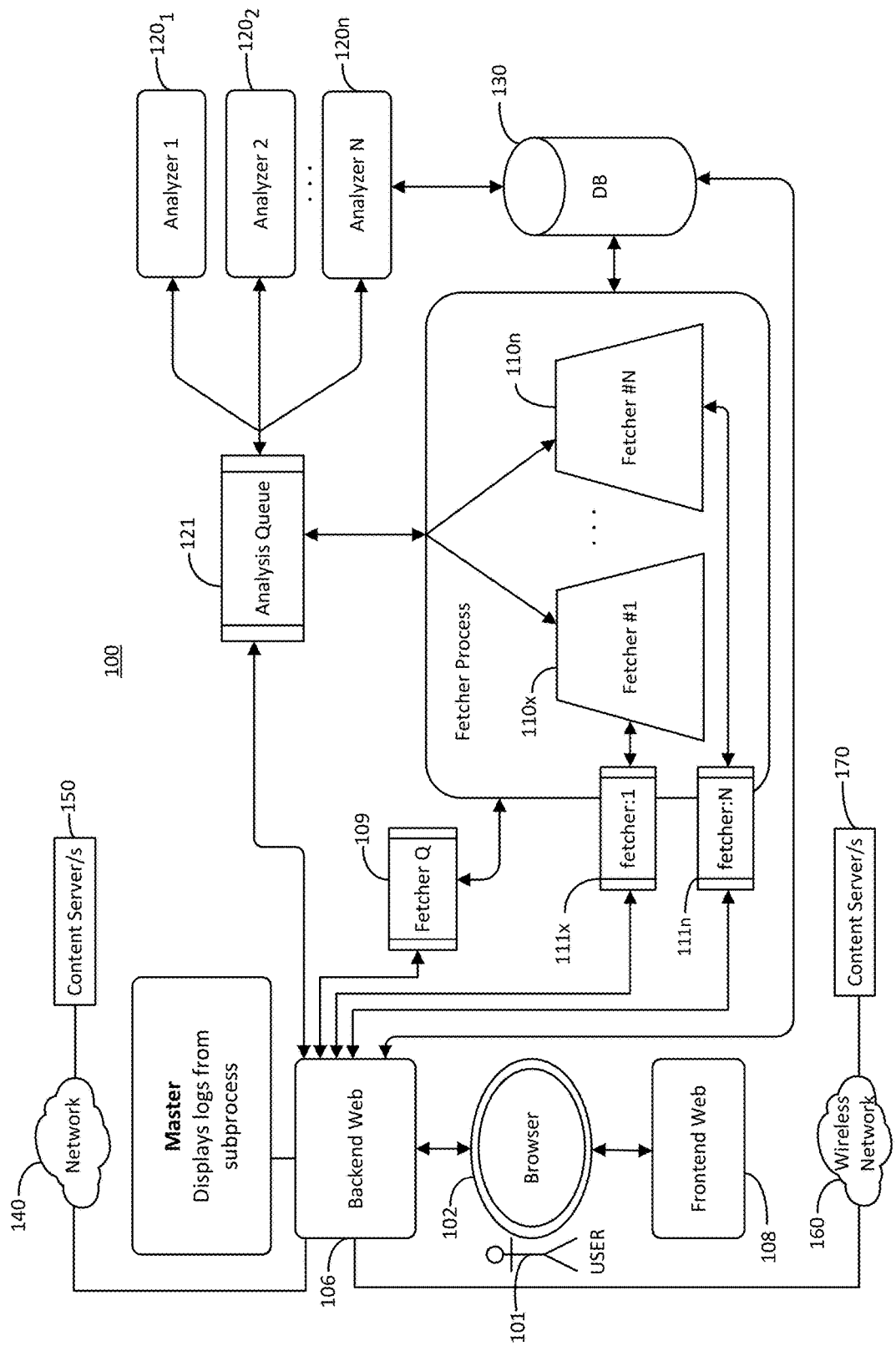
FIG. 1 is a block diagram that illustrates a network architecture of a system for analyzing data streams according to embodiments of the disclosure.

FIG. 1 is a block diagram that illustrates a network architecture 100 of a system for analyzing data streams according to embodiments of the disclosure. In general, a user 101 interacts through an internet browser 102 coupled to a backend web server 106. Example computer and computer network hardware that may be used to implement the backend web server 106 and other portions of a computer network is described below with reference to FIG. 6 and FIG. 7. The backend web server 106 may implement a Representational State Transfer (REST) Application Programming Interface (API) that allows interaction with the rest of the system. Other APIs or other systems may also be used. The backend web server 106 may further interact with the internet browser 102 through a frontend web services 108, which serves static content for a user interface, such as HTML, Javascript, CSS, image formats and JSON, all of which are well known.

A job queue 109 may include a fetcher process 110. In turn, the fetcher process 110 may include multiple individual fetchers 110$x$-110$n$, as indicated in FIG. 1. Fetchers acquire data from a data stream such as a video stream. In some embodiments, due to fetching a stream being a long running task, when fetching begins, an additional queue 109 specific to that fetch is created, allowing the backend web service 106 to query and control the fetching process. Fetchers and the fetcher process are described in detail below.

An analysis queue 120 performs analysis on the fetched data and generate alerts that may be sent to the user 101. In the example illustrated in FIG. 1, an analysis queue 120 may include one or more analyzers 120$x$-120$n$, each of which may perform analysis on the data previously, or simultaneously, retrieved by the fetchers 110. Analyzers and the analysis process is described in detail below.

Fetchers 110$x$ and Analyzers 120$x$ are coupled to and may store the results of their work in a scalable bulk database storage system 130, also referred to as the database. The storage system may include both hardware and services, such as Amazon Web Services, provided by Amazon.com, Inc, or equivalent. The backend web server 106 can also retrieve these results from the database storage system 130 to provide the user 101 with analysis reports or to implement replay and/or content cleaning transformation services, as described in detail below.

Fetching and Data Storage

In embodiments of the invention, the fetcher utility, also referred to as the fetcher 110, retrieves video content from content servers 150, 170. The fetchers 110 may access the content servers 150, 170 through the backend webserver 106, which is connected through the internet 140 and/or a wireless network 160 to the content servers. In other embodiments the content servers 150, 170 may be coupled to the database 130.

In addition to storing all transferred data, the fetchers 110 add additional data before storing the stream in the database 130. For example, the fetcher 110 maintains a download record for each individual segment (one segment in the case of a protocol like the Real-Time Messaging Protocol (RTMP), many segments in the case of Dynamic Adaptive Streaming over HTTP (DASH) or HTTP Live Streaming (HLS) or similar formats. The download record may contain some or all the following information: a list of any Hypertext Transport Protocol (HTTP) headers or similar metadata sent by the content server 150, the outcome of the request (including both HTTP status codes, error text if any is present, and any low level failures e.g. socket disconnected, socket timed out, etc.), whether the request was redirected and if so to what Universal Resource Locators (URLs), and a download event list. The download event list may contain a sequence of time-stamped event records describing the evolution of the fetching request. These events may include: when each redirected request started and ended, the overall completion time, time from completion of download to close of connection, and how many bytes have been downloaded at each moment of time from beginning of the request to completion. Additionally, the fetcher 110 includes a video server emulator that can recreate the behavior of the recorded stream fetch. In other words, the video server emulator serves the previously stored data exactly as it was received, including the order and speed of content, headers, and redirects, etc. For example, in the case of a fetched HLS stream, the fetcher 110 reloads manifests from live streams, requests secondary assets such as subtitle tracks and Digital Rights Management (DRM) encryption keys, and downloads segments from media playlists in order. Unlike a normal video playback application, the emulator of the fetcher 110 serves (in the case of HLS) the segments from media playlists and multiple streams at different negotiated bitrates simultaneously (or in the case of protocols like RTMP or WebRTC, a single segment) when running against content servers 150 that do not throttle overall download traffic. Additionally, the fetcher may synthesize a stream from elements of the original stream which force the playback application to switch content in specific ways.

In addition to raw data and download records, the fetcher 110 also generates an overall timeline of stream state of a fetched data stream. In these embodiments the fetcher 110 creates a timeline that contains a sequence of timeline events. Timeline events may be stored in an asset dictionary or asset map. Each timeline event represents knowledge about the state of the data stream at a given moment, tied to a specific download that completed at that moment. Timeline events correlate their downloaded item to a parent item that informed the download that was fetched—for instance, in HLS, a media segment would have the media playlist that identified it as its parent. Additionally, timeline events may contain information about the emulated player state important to analysis, such as sequence number, discontinuity number, and encryption state from an HLS manifest being stored on a timeline event of a media segment. Finally, a timeline event also stores a list of references to related data: the download record for the request that caused the timeline event to be logged, the raw data of the downloaded item, and analysis related to the contents of the downloaded item, as described below. Timeline events are used to update a dictionary that maps assets in the stream (typically identified by URL) to last known timeline event related to that item. As a result, other utilities can reproduce an exact known state of a stream at a given moment in time by advancing through the timeline and using the asset dictionary to look up the total known state of the stream at that time.

In some embodiments, the fetcher 110 stores into the database 130 detailed records of the download process. Not only are headers and other metadata logged, but the progress of the download over time is captured as well. This allows diagnosis of borderline server behaviors like stalls in the middle of a segment download. The data retrieved by the fetcher 110 is also archived. Every manifest, segment, subtitle state, AES key, etc. is stored in the database 130, or elsewhere, for a configurable time period. This allows later review or reanalysis. In some embodiments, the fetcher 110 retrieves each bitrate of a stream as if a player were downloading it, i.e., in the order for playing. Manifests are reloaded if appropriate or necessary. If the server implements bandwidth throttling, the fetcher can download each bitrate in turn to avoid skewing download speed data.

Embodiments of the invention can fetch data streams from multiple locations, such as multiple data centers from various content servers 150, 170. In some embodiments, the backend webserver 106 is coupled to content servers 170 through a cellular or wireless network 160. Such wireless networks 160 may include WiFi, Bluetooth, WiMax, LoRa, etc. In such embodiments, a fetcher 110 is coupled to one or more content servers 170 through the wireless network 160, which provides access to data streams. These streams may be either fully download or stochastically sampled. For instance, if a user wants to live stream a soccer game, the user 101 can deploy cellular monitoring hardware around Portland ahead of time to confirm that the stream will work well for a core fanbase. In effect, the system acts like a Nielsen box for QoE.

Analysis

Embodiments of the invention may also include an analysis utility. Analysis is the process of taking raw data that was stored by the fetcher 110, and/or other data generated by the fetcher, such as a contemporaneously generated download record, and extracting useful information from it. As described below, the data retrieved by the fetcher 110 is tracked in detail through parsing and analysis steps. This is beneficial, for example, when processing a video segment that has a corrupted H.264 frame. In embodiments of the invention, the analyzer 120 could be tracked back to the original byte ranges containing the corrupted frame, even when it is spread across a segment or segments in many TS packets. By analyzing such data, embodiments of the invention can determine if the bad frame is due to file corruption, bad packaging, or bad encoding.

After the input data is fully parsed, the system checks for anomalies or "quirks," and generates one or more alerts for the user. An alert is a fact about the input data determined by analyzing the original downloaded data or data describing the downloaded data. For instance, some alerts include: the presence of escape bytes in a video segment, whether a stream is live or VOD, or if out of order decode timestamps are present. A list of alerts is included as an appendix to this specification.

Processing for alerts may be cross-referenced against the particular video players deployed by the user 101, then displayed in priority order. For example, escape bytes might be fully supported by iOS, but not supported by JW Player. If the user 101 indicates they are using iOS and JW Player, the stream is flagged with an alert indicating an error will occur. However, if the user 101 only use iOS, then the stream will only be associated with an information alert.

The data input for the analyzer 120 is captured data from a fetcher 110. Because of this, fetched data can be reanalyzed if analysis is improved after the initial pass. Each analysis and fetcher session is stored independently, allowing any number of streams downloads and analyses. This also makes the overall system resilient against any bugs in analysis or a cluster crash during analysis.

The analysis utility accepts the raw downloaded bytes and the related timeline events that were created by the fetcher 110 and stored in the database 130, such as the download record, encryption state, and manifest information. At a high level, each layer of the incoming format is parsed and a detailed record of data that flows through the parser is created, along with annotations indicating observations about the data at that stage, such as whether it contained corruption, if it had valid timing information, if it contained escape bytes, etc. This parsing and mapping process is discussed in detail below. Annotations are generated automatically by a parsing function of the analyzer 120 using a rule database as described below. The rule database may be stored on the backend web 106, and/or database 130, or hardcoded into the analyzer 120 itself, and retrieved by the analyzer 120 as needed. This analysis record created by the analyzer 120, including the low level parsing details as described above and following, and the "observations" as described below, as well as contextual metadata related to item in question such as its manifest sequence identifier, what encryption key is used to decrypt it, etc.—is stored in the database 130 for use in later analysis and reporting steps.

Figure 2:
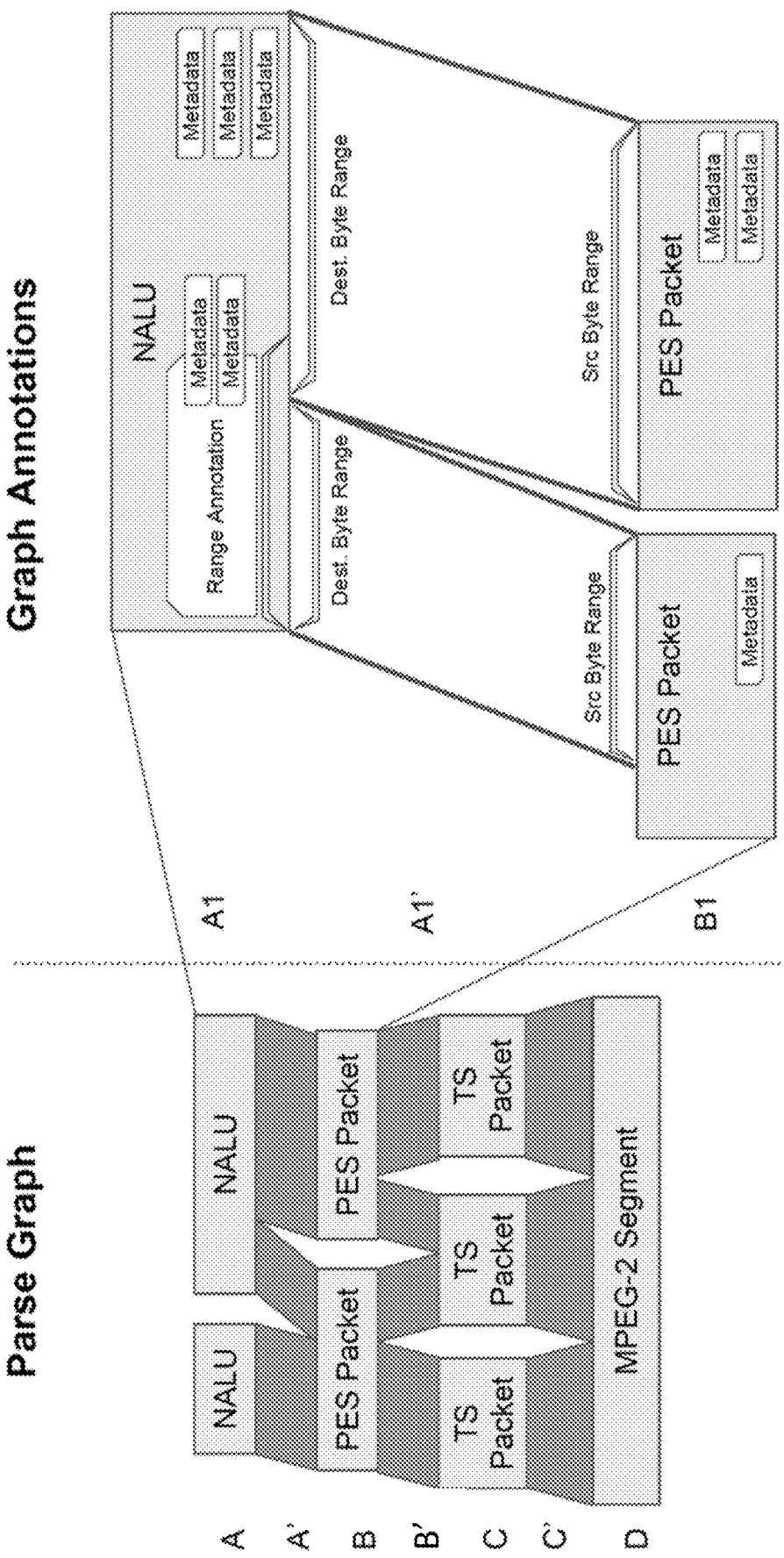
FIG. 2 is a block diagram that illustrates a data parsing process used to translate data from one format to one or more other formats for analysis according to embodiments of the disclosure.

FIG. 2 is a block diagram that illustrates a data parsing process used by the analyzer 120 to translate data from one format to one or more other formats for analysis according to embodiments of the disclosure.

Embodiments of the invention generate a parse graph describing the parsing process for input data, such as the example shown in FIG. 2. Nodes (A, B, C, D) represent units of data relevant to the parsing process. Edges (A', B', C') indicate annotated mappings showing data flow between the input and output for each parsing step.

The sub-graphs A1, A1' and B1 shown in FIG. 2 graphically illustrate how metadata can be associated with nodes and edges, as well as the structure of edges and nodes in more detail. Metadata can include, for example, whether a range includes valid or corrupted data, the decode timestamp or playback timestamp of the data, the type of the data (e.g., is it related to a specific video/audio/data stream), references to related items (for instance, the specific items in a manifest describing this piece of data), or whether the timestamp of the input data (B1) is inconsistent with a timestamp contained in the output data (A1). Edges (A1') have a source and destination byte range, connecting the parsing step output (A1) with the parsing step input (B1). Multiple edges can associate byte ranges between the same two nodes, although each destination byte is typically associated with a single source byte. Many input bytes are not associated with output bytes—for instance, header data from the input bytes will not typically be included in the output bytes. B1 illustrates that one or more metadata elements can be associated with a node. A1 illustrates that, in addition to node-level metadata, metadata can also be associated to a specific byte range. Examples of this metadata include identifying invalid TS packets in the input to the MPEG 2 TS packet parser—these bytes would not be passed on to later parsing stages but are of special interest to the analysis process. Another example is identifying a range of bytes that encode an encryption key. The key bytes are essential to parsing, but do not strictly map to input or output bytes.

The specific example illustrated in FIG. 2 shows a specific video processing scenario. In this example, an MPEG-2 transport segment containing a trivial single h264 video stream is analyzed. The MPEG-2 transport segment is parsed into transport stream packets as described in U.S. Pat. No. 7,724,682, (Method and system for generating transport stream packets) and U.S. Pat. No. 6,226,291 (Transport stream packet parser system), then into packetized elementary streams as described in U.S. Pat. No. 5,521,927 (Elementary stream packetizing unit for MPEG-2 system) and U.S. Pat. No. 7,376,692 (Method and system for receiving and framing packetized data), and finally into network abstraction logical units as described in U.S. Pat. No. 9,344,362 (Packet format of network abstraction layer unit, and algorithm and apparatus for video encoding and decoding using the format, QOS control algorithm and apparatus for IPV6 label switching using the format) and U.S. Pat. No. 7,724,818 (Method for coding sequences of pictures).

FIG. 2 shows the results of each stage of parsing shown in levels A, B, C and D. The MPEG-2 Transport Segment (D) is parsed into TS Packets (C) and so on. Each level of data is parsed preserving "range maps" correlating ranges of bytes in the source data to ranges of bytes in the destination data for each stage of parsing. The corresponding byte range mappings are visible in rows A', B' and C'. It is observed in C' that each TS Packet corresponds to contiguous byte ranges in the MPEG 2 Transport Segment. Shown in B', TS Packets can contain data that is parsed into one or more overlapping PES Packets. Finally, as shown in A', PES Packets similarly hold data related to one or more NALUs.

In another scenario, data from a related set of Web content is served over HTTP and a Web Socket connection. Each individual HTTP stream is captured by one or more fetchers 110 and parsed into the files served over it. The files are then parsed by an analyzer 120 into more specific representations (e.g., HTML document into an XML representation, compressed images into their component elements, CSS into a list-of-rules format). The Web Socket stream is also captured and parsed. Finally, WebRTC streams are opened by the page, and these are also captured and parsed. Finally, a rule set is applied by one or more analyzer 120 to determine if the WebRTC data is compatible with a target set of browsers based on this overall set of data. The other files are important for this as they control how the WebRTC connection is initiated and exposed to users. In addition to analyzing WebRTC playback, the other data can be used to perform analysis with regards to the content's behavior on different web browsers. For instance, a specific slow loading asset may cause the page to render incorrectly for a period of time in some browsers. In some embodiments the web content itself may be analyzed for potential issues with being displayed on the web browser itself, such as loading problems, slow loading times, improper formatting, etc.

Note that this parse graph is distinct from an Abstract Syntax Tree because a) the AST does not relate multiple processing steps, but rather, is a structure which is mutated by those steps, b) an AST is not typically used to flow of bytes from one compiler stage to another and c) as shown, in-practice, real-world data processing scenarios generally do not map to tree structures.

As the parse graph is generated by the analyzer 120, the parsing steps may associate metadata related either to their specific processing, or metadata that aggregates or interprets metadata from input edges/nodes. For instance, a malformed TS Packet may be annotated with a "corrupt TS packet" tag, which the PES parser might use to annotate related PES Packets with a "potentially corrupt PES packet" tag. If detailed capture data, described below, is present, nodes can be annotated with the times they would become available for playback based on when data was downloaded. For example, this time data would identify well-formed streams that nevertheless would not play smoothly.

Multiple logical units (e.g., MPEG-2 segments, HLS manifests, subtitle segments) may be parsed as described above, producing a set of related parse graphs and notable subsets. For instance, all segments related to a video stream at a specific bitrate may be marked as related. An analyzer 120 may then evaluate one or more rules against the parse graphs and their annotations. For instance, one rule could annotate segments with the time range their video frames cover, along with an annotation noting whether the frames cover a contiguous period of time. Another rule could look at all the segments in a bitrate to determine if the overall set of video frames fail to cover a contiguous period of time, and add an annotation to the bitrate's subset if this failure condition occurs. Finally, a third rule could evaluate the annotations of all the subsets and generate an aggregated report to be presented to the user 101.

In some embodiments, the analyzer 120 may be used to identify issues related to the data stream. By applying rules to the metadata and annotations in the parsed data segments, the analyzer 120 may detect many traits and problematic behaviors. It is understood that a vast number of rules implemented by the analyzer 120 are possible and useful. For example, with reference back to FIG. 2, H.264 Annex B NALUs can optionally contain emulation prevention bytes (EPBs), which are used to replace patterns of bytes that would confuse synchronization mechanisms generally found in satellite broadcast applications. In the context of internet transfer, they are not needed. A fully compliant player must strip these bytes to correctly decode audio and video data. However, some players do not implement this stripping and exhibit problems when they encounter such byte patterns. The patterns are typically momentary picture corruptions, but sometimes much more serious problems arise, such as crashes or failure to display any subsequent video frames. In some embodiments, presence of EPBs is noted by the parser in annotated metadata. The analyzer 120 iterates over all of the parsed data with annotations after parsing is complete, and, if this EPB presence flag is observed, the analyzer 120 flags in the final report to the user 101 that this specific issue is present and some players will not play the MPEG TS correctly. By identifying the DTS/PTS of the PES packet RMB containing the NALU RMB with the issue, the specific time at which the issue will occur in playback can be identified. If necessary, the exact bytes in the input file, which is potentially made up of ranges spread over many PES packets and TS packets, can be identified to aid debugging the issue.

In some embodiments, the analyzer 120 performs this "per item" analysis on every downloaded item that was retrieved by the fetcher 120. Simultaneously or subsequently, "differential" analysis can be performed on the data stored in the database 130. For example, an asset map may be updated by evaluating timeline events in advancing time order as described above. Analysis of individual files may also occur at this point. Then, after the overall stream state has been collected, a final global analysis step may be performed by comparing the analyses of different components of the stream.

For assets identified by a published format specification as immutable, such as a TS media segment in HLS, a change in contents is immediately flagged as an alert having an error status. For assets that can mutate, such as a media playlist in an HLS live stream, the old and new analysis data for that item are loaded, and the analyzer 120 uses a set of rules to evaluate against the data to flag any issues. A wide variety of scenarios may be evaluated. For example, in an HLS live stream, media playlists are updated by the content server 150, 170 according to rules defined by the HLS specification. HLS media playlists implicitly define a sequence number for each media segment in the playlist, as well as a counter explicitly indicating the sequence number of the first media segment in the playlist. The sequence number for a given media segment should always be the same across all media playlist updates. For example, futbar0xFF.ts, if once shown with sequence number 18, should never be associated with another sequence number. If two manifest states don't agree on these sequence numbers, video players may confuse segments and play content with skips or repetitions, so an error alert is flagged for the user. Therefore, an alert having an error state is associated with this change and propagated through the system for review by the user 101.

A final analysis step is performed by the analyzer 120 after a full asset map is generated by the fetcher 110 from all observed states of all assets in the stream and stored in the database 130. Various queries may be performed at this point by one or more analyzers 120 to aid identification of issues. One or more of the alerts, described in detail below, may be generated by the analyzer 120 in this final analysis step. In the case of the previous HLS example, by looking at the parent item for each media segment, media segments can be grouped into lists by their parent playlist. Then, by evaluating at the manifest state noted in each segment's timeline event, the segments may be put in correct playback order. At this point, the start and end time of each segment are compared to confirm that there are no gaps or overlaps in video or audio data. Additionally, cross-substream analysis can be performed—for instance, the analyzer 120 can compare all the segments in bit rate A with the corresponding (by sequence/discontinuity number) segments in bit rate B, to determine if the start and end presentation timestamps of their contents match. If they do not match, an alert is generated to indicate that, during bitrate switches, video players may skip or repeat content, or that they may have to download additional segments (thus wasting bandwidth and causing further unnecessary bitrate switches or stalls in playback) for correct playback because they will not find the expected presentation timestamp ranges The above described analysis system may be used to identify many issues even on a relatively compliant and well-formed data stream. The issues could be flagged on specific bytes in an asset, on the asset as a whole, on a set of assets, or even the whole stream. The "alerts" system introduced above is used to capture, correlate, and present these issues in a manageable way. In some embodiments of the invention, the alerts for an item may include a dictionary indexed by an alert name, which is a string uniquely identifying a specific class of issues. Example alert names include "tsCorrupt" for a corrupt MPEG TS packet, and "noPPS" for H.264 video content lacking a Picture Parameter Set within the containing transport segment. A set of alerts is provided as an appendix. Note that alerts do not necessarily indicate an error or problem—depending on the details of the playback environment (speed of connection, specific playback hardware/software), many alerts are completely benign. Some alerts are purely informational, for instance, such alerts may be used to note the level/profile of audio and video codecs. The entry indexed by this string contains a list of occurrences, identifying the specific step of analysis where the issue was identified and any other related information about the issue. For instance, if segments are misaligned between two media playlists in an HLS stream as mentioned above, the related information in an occurrence includes the URLs of the media playlists, the URLs of the media segments, the start/end times of each segment, and the amount by which misalignment occurred.

If every segment in such a video stream were misaligned, a large stream could generate tens of thousands of occurrences for the alignment alert alone. Presenting this data to the user 101 would be overwhelming. Therefore, alerts are summarized by omitting the occurrence list and storing only the dictionary of alert names as the alert analysis progresses. For instance, a TS media segment might contain 50 occurrences of the "tsCorrupt" alert condition, but its parent, the media playlist that referenced it, would only contain one non-specific occurrence of the "tsCorrupt" alert condition.

An alert table is a database defining information about each type of alert. It may be stored on the backend webserver 106 or elsewhere on the system. This alert table defines severity of alerts, and provides localized strings used in user interfaces. Alerts may be indexed by name and the resulting information used to present severity to the end user 101. In other embodiments the alerts are indexed by other methods. Further, alert severity is cross-indexed with specific media players and versions of those media players so that end users 101, by entering a list of the players they need to support, can see a report customized for their particular environment. With reference back to FIG. 1, the report is presented to the browser 102 on the frontend webserver 108 for presenting to the user 101. Alerts related to violations of specifications or best practices documents also contain citations identifying the document(s) and subsection(s) containing the specific rule or practice that is being violated.

For some alert levels, or for particular alerts within a given level, the data stream analysis system may automatically generate an email, pager notification, SMS or MMS message, and/or telephone call to notify the user 101 of the new alert. For example, the system may be configured to periodically retrieve a new copy of an existing data stream periodically, for example weekly. Then, after the new copy is fetched by the fetcher 110 and analyzed by the analyzer 120, if a serious alert is generated, the system automatically generates a notice about the new alert and sends it to the user 101 using one of the described communication channels, for example an automatically generated SMS message that includes details about the new alert.

In some embodiments, the analyzer 120 can further identify differences in stream state over time. All of the above-mentioned analyzer and fetcher data is stored and correlated with a session identifier, a universally unique identifier identifying a particular occurrence of download and/or analysis of a specific stream. The user may re-fetch and re-analyze the same stream at a later time (for instance, after switching hosting to a new video distribution network), and compare the two sessions. By comparing the two reports, a "difference report" is generated. The report identifies any alerts added or removed from the stream, as well as any structural changes, including added or removed bitrates, added or removed segments, changes to manifests, and so on.

Reporting and Replay

After the analysis has been performed by the analyzer 120, the results of the analysis of the data is made available to the user 101. By selecting the proper report or interactive process through the browser 102, the user 101 can review details of the stream download process or the data within it in detail. For instance, the user 101 may use the browser 102 to see what NALUs are present in the analyzed data stream, and in what order they show up, or to review manifest content.

Embodiments of the invention also include a replay utility. The replay utility is used to take stored data (as generated by the fetcher 110 and analyzer 120) and recreate that stream as it was observed for playback. End users may use this to confirm, identify or test issues in streams. Additionally, the replay utility can generate modified streams using subsets of the captured data that force playback of specific bitrates or other conditions. An example of this use is forcing a specific sequence of quality level changes to occur or corrupting a specific part of the captured data to exercise error compensation logic by presenting a playlist that references media segments from one media playlist for part of the playlist, and media segments from another media playlist for the remainder. To replay previously stored and analyzed data streams, the user 101 selects the proper menu selection through the browser 102, which causes the system to access the proper data stored on the database 130. In some embodiments the replay utility may be performed by an analyzer 120.

Because replay implicitly performs time shifting, the replay function can also help diagnose time-related issues. For instance, MPEG TS streams often exhibit issues when its timestamps roll over, which occurs approximately every 27 hours. These issues are often overlooked because by the time engineering looks at an error report, the issue has shifted to the middle of the night instead of day time—so engineering sees everything working fine. With the replay function, it's easy for a reviewer to localize the issue to a specific period by selecting the proper parameters for the video stream. Because the reviewer sees the same timestamps and content served when the issue was observed, the problem may be resolved much more quickly and accurately.

Figure 3:
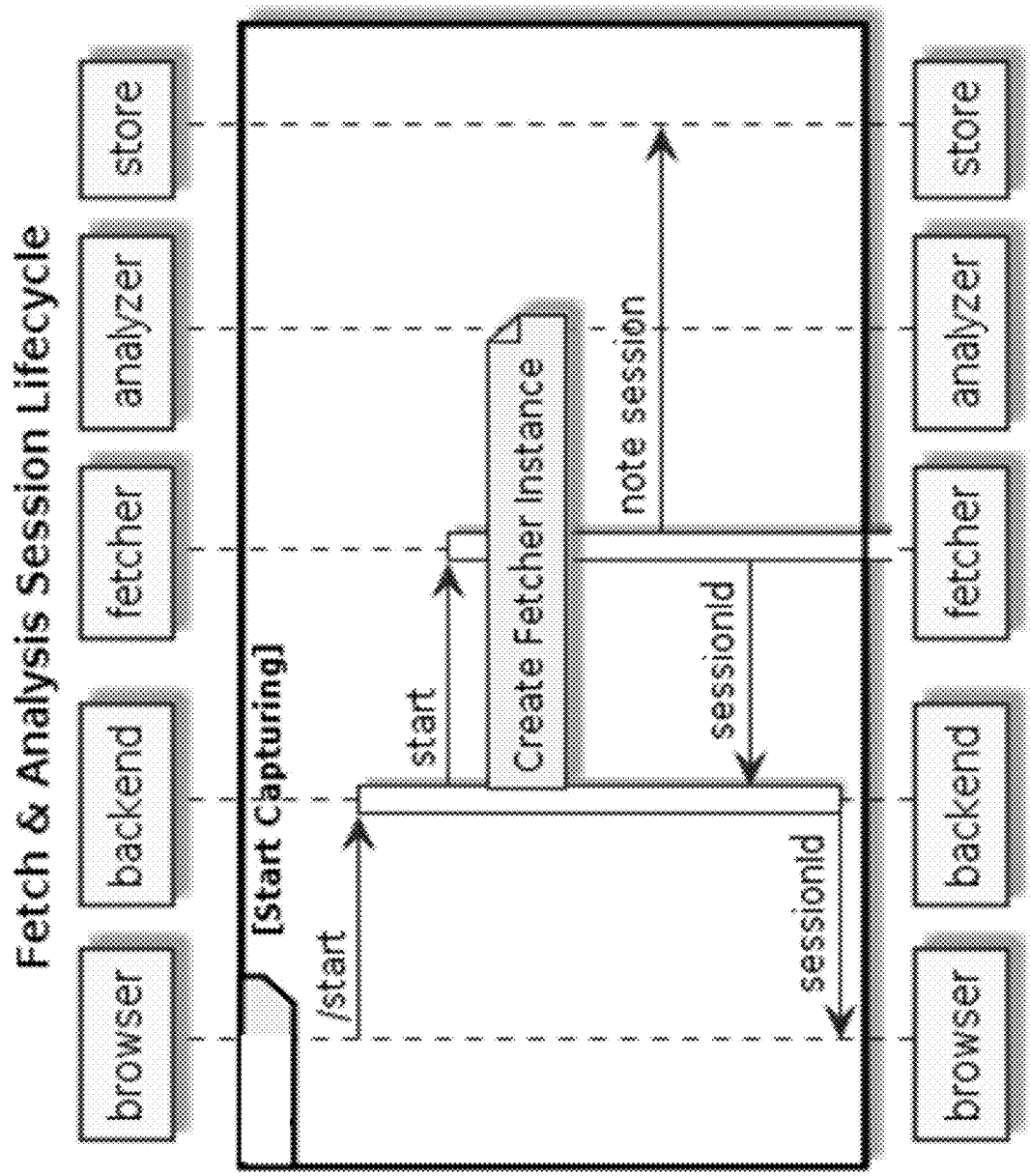
FIG. 3 is a sequence diagram that illustrates example operations used in fetching a data stream according to embodiments of the disclosure.

FIG. 3 is a sequence diagram for an example fetcher process 110 used for capturing a data stream. For example, with reference to FIG. 1 and FIG. 3, the user 101 interacts with the browser, which makes a REST call against the backend webserver 106. The backend web server 106 submits a start job via the fetcher job queue 109, which is picked up by a particular fetcher 110x. A session is noted by the fetcher 110 in an application data store 111, such as a Structured Query Language (SQL) database. Finally, the session ID identifying the fetching of the specified video stream is returned to the user 101 for future reference.

Figure 4:
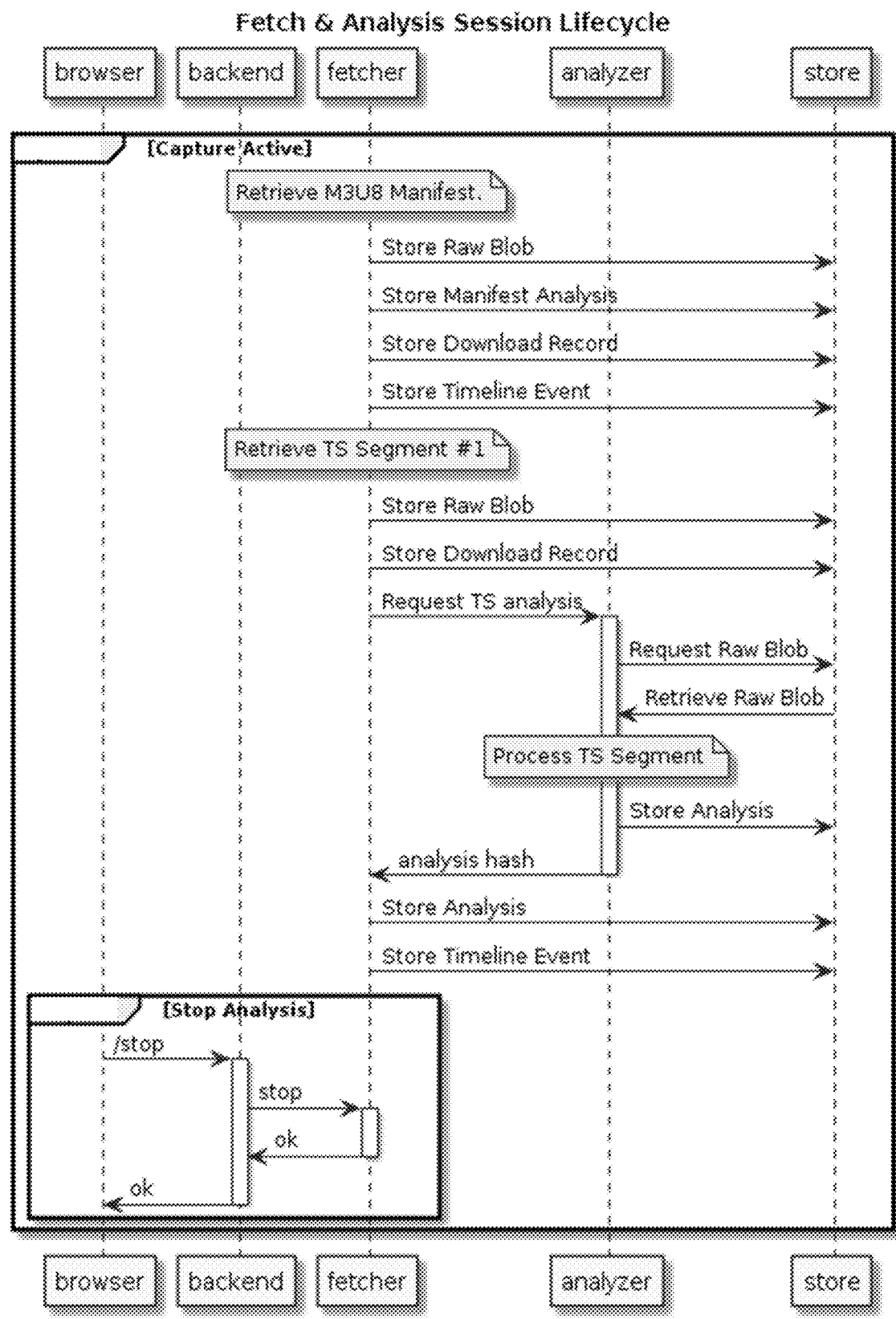
FIG. 4 is a sequence diagram that illustrates example operations used in fetching and analyzing a data stream according to embodiments of the disclosure.

Similarly, FIG. 4 is a sequence diagram for a fetcher 110 downloading an HLS stream. In this example, a fetcher 110 retrieves, for example, an M3U8 manifest, which is an encoded playlist file, and stores data related to the fetching process in either the database 130 or the fetcher job queue 109. Once fetched, the fetcher 110 begins to fetch the segments in the stream starting with segment 1. Once segment 1 is downloaded, a request is made to an analyzer 120x to perform analysis of the segment. Additionally, the process to stop fetching is shown at the bottom of the diagram.

Figure 5:
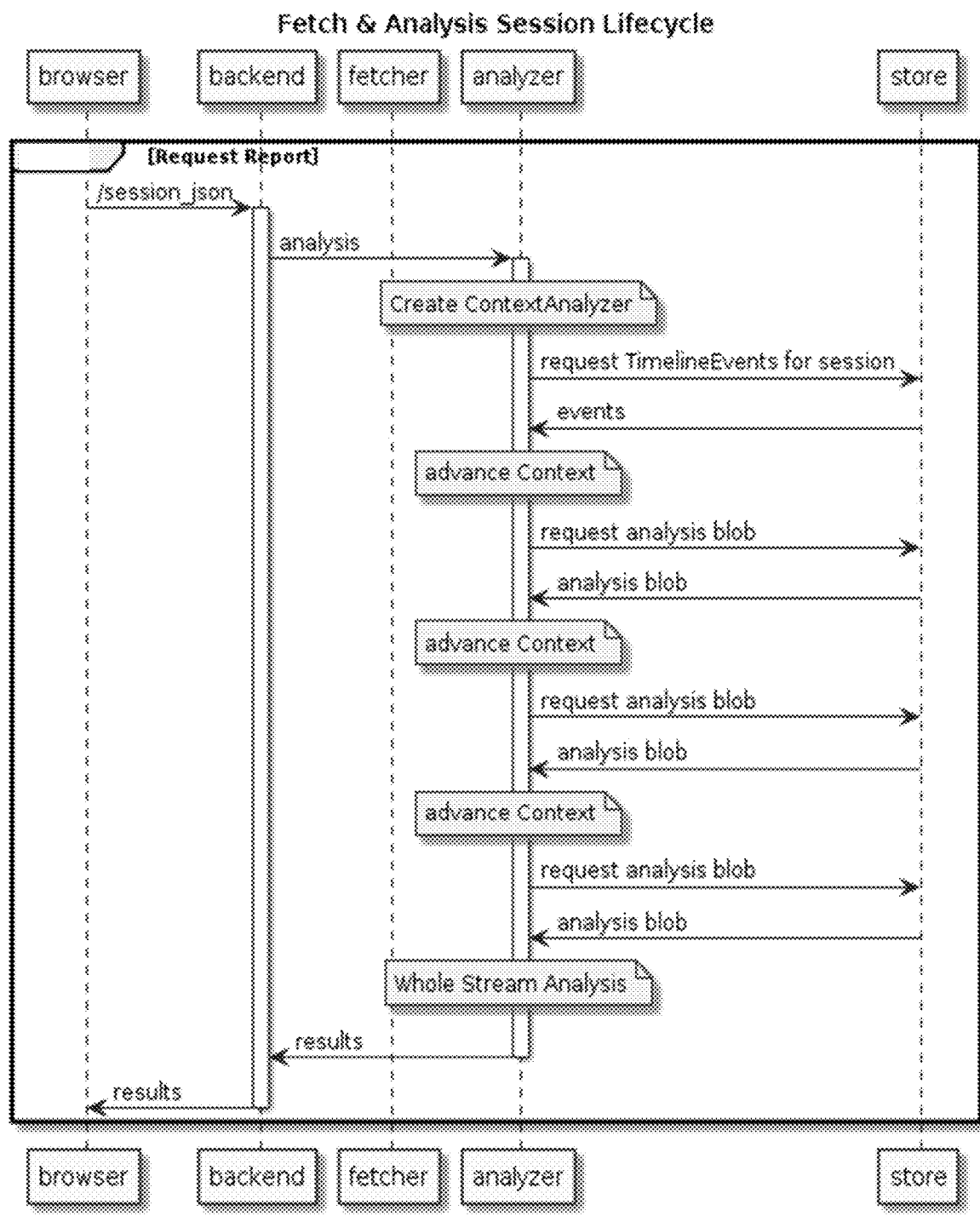
FIG. 5 is a sequence diagram that illustrates example operations used in analyzing a data stream according to embodiments of the disclosure.

FIG. 5 is a sequence diagram for a user 101 requesting a report on a previously captured video stream. The request is made through the browser and an analyzer 120 is notified. The analyzer 120 initializes an appropriate data structure used for analysis, stored either locally within the analyzer or on the database 130. Then the analyzer 120 requests all of the timeline events for the specified session from the application's data store. Next, the analyzer 120 advances through each timeline event, requesting related segment analysis results from the application data store. When all timeline events are processed and all analysis data has been accumulated, a whole stream "differential" analysis is performed. The results of the analysis are then returned to the user through the browser 102.

Embodiments of the invention also implement a method for presenting complex URLs to users in a manageable way. URLs used in video streams are commonly hundreds of characters long. These URLs include a large quantity of metadata, most of which is the same for a specific stream or substream. As a result, only a small fraction of the total URL is relevant to a human reader. Embodiments of the invention construct lists of related URLs, for instance, all the URLs of media segments in the same media playlist. Then, for each URL in the list, a text difference algorithm, such as the Eugene W Myers algorithm performs a difference function of the URLs in the list. The largest difference, for example as measured by a count of characters added/replaced, is selected, then all unmodified characters are removed from the original URL and replaced with a short marker text. A dictionary of original URL to reduced string is stored in the database 130 to avoid recalculating the values. In the user interface generated by the browser 102, the shortened URLs are displayed initially, but the long URLs can be also seen, retrieved via the map, by clicking on and/or hovering over the short URLs.

Embodiments of the invention further implement a tool for removing user intellectual property (IP) from streams without modifying the characteristics of the stream. For example, some data streams include copyrighted intellectual property, such as movies, video clips, or audio data. Some copyrights allow for an initial download of copyrighted data, for example for live viewing, but prohibit storing copyrighted data otherwise. Embodiments of the invention provide a facility for storing data streams that contain copyrighted data indefinitely without IP licensing concerns. In operation, a content cleaner tool traverses the stored parse graph and its annotations, generated for a segment, searching for final content, for instance, the byte ranges or range map buffers describing NALUs, AAC frames, CEA-608 closed captions, and ID3 tags. Each element that contains IP-restricted content is replaced with content that is not encumbered with third party IP restrictions. Different algorithms may be used for different types of content.

Regardless of the type of content, the following procedure is used to replace content. Byte ranges within the parse graph containing the specific data to be replaced are enumerated. For instance, the list of data graphs corresponding to the H.264 NALUs in an MPEG TS segment is opened and accessed. For each element in this set, replacement content of identical length and type is generated. For instance, a frame of resolution 1024 pixels by 768 pixels would be replaced by another frame of the same resolution and byte length. An audio frame of stereo AC3 audio at 44.1 khz sample rate would be replaced with another audio frame of stereo AC3 audio at 44.1 khz sample rate. A query operation, which may be a function within the analyzer 120, is used to find the corresponding ranges in the root element for the target element. Each byte of generated content is written sequentially to the ranges in the order they occur in the root element. Once all copyrighted content is replaced, the modified buffer can be used freely without copyright liability.

In general, copyrighted text in metadata and closed captions are replaced by procedurally generated text of identical length. Text of exact length may be generated by a greedy algorithm combined with a probabilistic word generator. The probabilistic word generator can take one of two forms. In the first form, it uses a Markov chain trained on a corpus of public domain text. When the Markov chain is used to generate a string of a specific length, the following algorithm may be used: at each step of generation, selection is done by weighted pseudo-random pick of the available possibilities. If the remaining number of bytes is less than the number of bytes of text added by any of the possible items at that step, they are removed from consideration for selection, and the remaining items have their weights scaled up to normalize to unity probability. In the second form, a table is pre-populated from a list of words. The table is indexed by length of word. Each entry of the table contains a list of possible words of that length. At each step, any entries in the table that contain words longer than the available remaining space are removed from consideration, and one of the remaining entries is selected randomly, followed by random selection of one of the words contained in that entry. Words from either form are concatenated with randomly selected punctuation to produce strings of the exact desired length.

Embodiments of the invention also replace copyrighted audio data. Headers defining sample rate, channel count, and related data are left unmodified. Uncompressed audio can be directly overwritten with generated audio (e.g., a sine wave). Compressed audio formats with support for filler bytes, such as AAC's FIL syntax element or AC3's auxdata, as described in the *ATSC Standard for Digital Audio Compression* (AC3, E-AC-3)), are replaced with a "specimen" compressed audio frame that is shorter than the copyrighted data. These specimens may be stored in the database 130 or elsewhere. One specimen is a sine wave with noise. The next smallest is a pure sine wave. The smallest option is silence. The largest that will fit in the available bytes with room for padding is selected, and followed by an appropriate padding element, such as FIL or auxdata in the above examples. Compressed audio formats without support for filler bytes or for which players do not have strong support for the filler byte feature, such as MP3, use a lookup table of pre-generated compressed frames. The correct size is selected and used to replace the copyrighted content. The variable size compressed frames are generated using generative and/or Monte Carlo algorithms that generate sets of samples by perturbing a reference set of samples. This is typically a sine wave of fixed frequency. These samples are compressed using a codec, and if they compress to an as-yet-unseen size, the samples are stored in the table for later use. For both the filler and the exact approach, variations of the replacement content may be generated for all the possible sampling rates, encoding mode settings and channel counts supported by the codec in question.

For video data, such as H.264 and H.265 streams, the following method may be used. NALU structure (ie type and length) is unmodified. Header data like Sequence Parameter Sets (SPS) and Picture Parameter Sets (PPS) are read and used to configure an encoder library, such as x264 for the appropriate format. In other words, the generated content will have identical framerate, resolution, aspect ratio, slice configuration, and compression profile levels as the copyrighted content. Next, a frame image is generated. In some embodiments, this frame includes an animated moving element, such as a circle moving back and forth, and a counter that is incremented by one for each frame produced. These elements allow viewers of the generated video content to determine, by visual inspection of frames, if frames are being skipped or if playback is not meeting the specified framerate. The image is encoded by the previously configured encoder. The same frame type as the replaced data is used. For example, if the frame type is an I-frame, the generated content is encoded as an I-frame. Similarly, P-frames are encoded as P-frames. If the encoded version of the frame does not fit in the available bytes, it is encoded at a progressively lower quality setting or with a progressively reduced bandwidth budget until it does fit. For formats without padding capabilities, or for players that cannot properly interpret padding, "fitting" means an exact fit of the length required to replace the copyrighted content. In the case of formats with padding capabilities, such as H.264 and H.265, which allow an unlimited number of leading 0x00 bytes at the start of a NALU, this padding capability is used to increase the size of the encoded frame until it is an exact fit.

Figure 6:
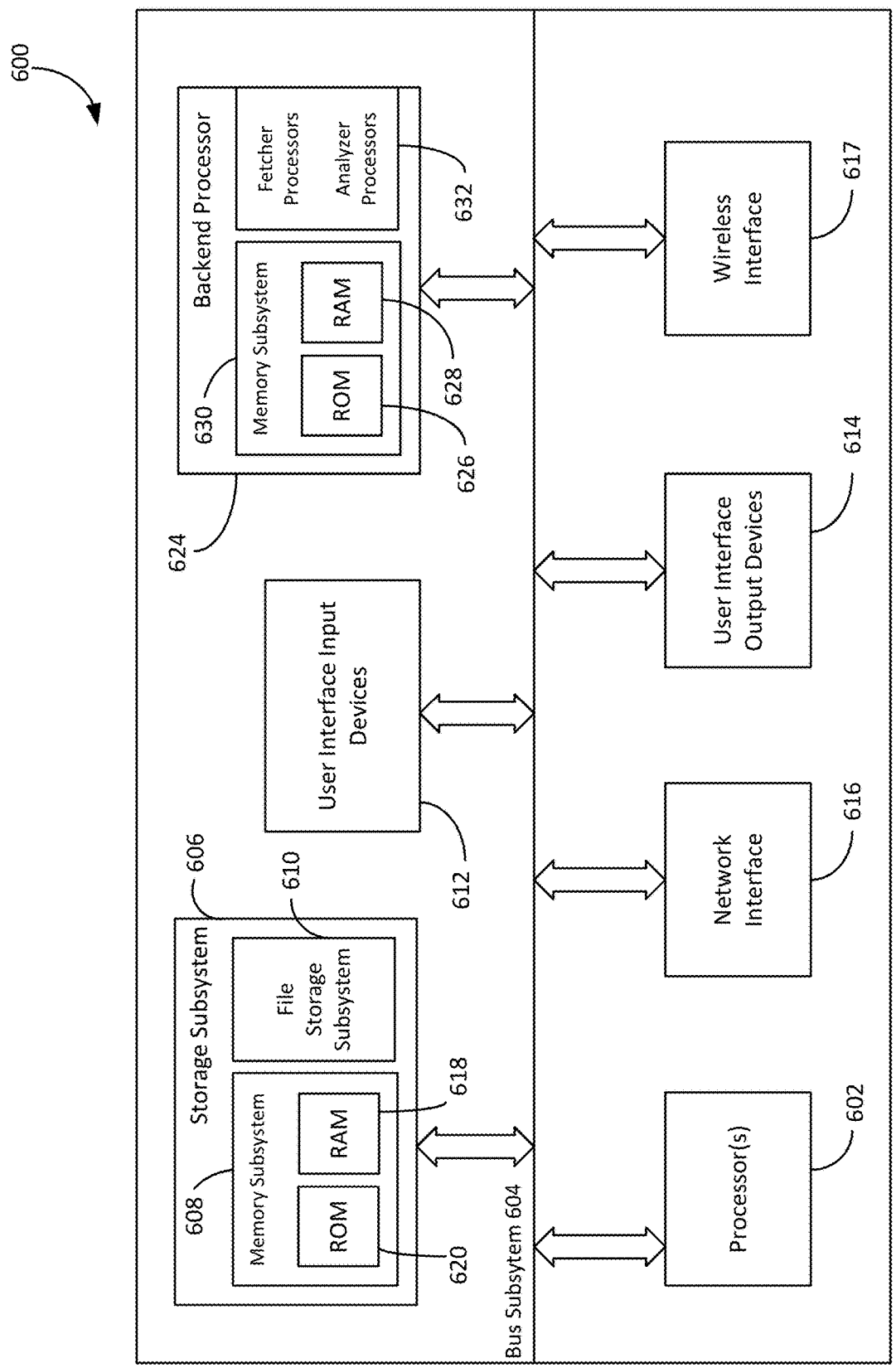
FIG. 6 is a block diagram that illustrates example computer hardware that may be used to perform embodiments of the invention.

FIG. 6 shows an illustrative example of a computing device 600 that may be used to process data streams in accordance with at least one embodiment. In various embodiments, the computing device 600 may be used to implement any of the systems illustrated herein and described above. For example, the computing device 600 may be used to access data streams, use one of more fetchers to generate local copies of the streams, to perform alert analysis on the streams, to store the streams or modified streams in an external database, to provide a user interface that allows a user to interact with the system, and for other uses. As shown in FIG. 6, the computing device 600 may include one or more processors 602 that may be configured to communicate with and are operatively coupled to a number of peripheral subsystems via a bus subsystem 604. These peripheral subsystems may include a storage subsystem 606, comprising a memory subsystem 608 and a file storage subsystem 610, one or more user interface input devices 612, one or more user interface output devices 614, a network interface subsystem 616, a backend processor 624, including a memory subsystem 630 and one or more fetcher processors and analyzer processors. Of course, any of the processors illustrated in the computing device 600 may be properly configured to perform any of the computing operations as described above.

The bus subsystem 604 may provide a mechanism for enabling the various components and subsystems of computing device 600 to communicate with each other as intended. Although the bus subsystem 604 is shown schematically as a single bus, alternative embodiments of the bus subsystem may utilize multiple busses.

The network interface subsystem 616 may provide an interface to other device systems and networks. The network interface subsystem 16 may serve as an interface for receiving data from and transmitting data to other systems from the computing device 600. For example, the network interface subsystem 616 may enable a customer to connect the computing device 600 to the internet. Further, a wireless interface 617 may allow the computing device 600 to connect to a wireless network for transmitting and receiving data while in a remote location. For example, the customer may utilize the computing device 600 to transmit a request for certain digital content to a digital content provider through a wireless access point. Additionally, the customer may use the computing device 600 to receive transmissions from the digital content provider through a similar wireless access point. The network interface subsystem 616 may also facilitate the receipt and/or transmission of data on other networks, such as a customer network.

The user interface input devices 612 may include one or buttons, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device 600.

User interface output devices 614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 600. The output device(s) 614 may be used, for example, to present user interfaces to facilitate user interaction with applications performing processes descried herein and variations therein, when such interaction may be appropriate.

The storage subsystem 606 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 606. These application modules or instructions may be executed by the one or more processors 602. The storage subsystem 606 may additionally provide a repository for storing data used in accordance with the present disclosure. The storage subsystem 606 may comprise a memory subsystem 608 and a file/disk storage subsystem 610. Additionally, the computing device 600 may cause data to be stored on another computer that is accessed through either the network interface 616 or network interface 618, for example.

The memory subsystem 608 may include a number of memories including a main random access memory (RAM) 618 for storage of instructions and data during program execution and a read only memory (ROM) 620 in which fixed instructions may be stored. The file storage subsystem 610 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The device 600 may be of various types including a portable computer device, tablet computer, mobile phone, a workstation, or any other data processing system that may provide portability for a customer or other user of the device 600. Additionally, the device system 600 may include another device that may be connected to the device 600 through one or more ports (e.g., USB, a headphone jack, Lightning connector, etc.). The device that may be connected to the device 600 may include a plurality of ports configured to accept fiber-optic connectors. Accordingly, this device may be configured to convert optical signals to electrical signals that may be transmitted through the port connecting the device to the device 600 for processing. Due to the ever-changing nature of computers and networks, the description of the device 600 depicted in FIG. 6 is intended only as a specific example for purposes of illustrating the preferred embodiment of the device. Many other configurations having more or fewer components than the system depicted in FIG. 6 are possible.

Figure 7:
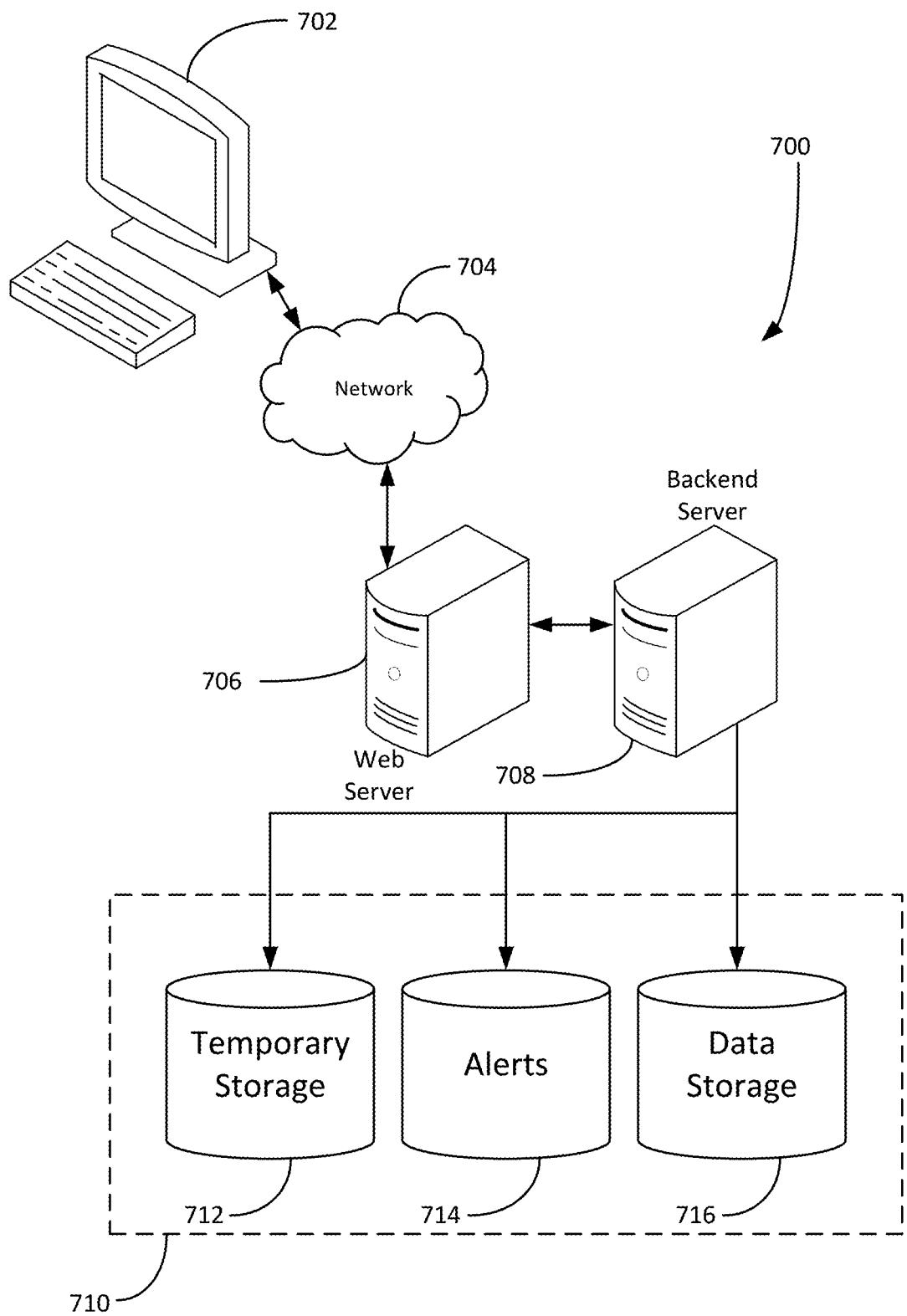
FIG. 7 is a block diagram that illustrates an example computer network that may be used to perform embodiments of the invention.

FIG. 7 illustrates aspects of an example environment 700 for implementing aspects in accordance with various embodiments. As will be appreciated, although a web-based environment is used for purposes of explanation, as was described above with reference to FIG. 1, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708, which may be used to implement the backend server 106 described above, and a data store 710. It should be understood that there can be several application servers, layers or other elements, processes or components, which may be chained or otherwise configured, which can interact to perform tasks such as obtaining data from an appropriate data store. In other embodiments, portions or all of the data store 710 may be housed in or integrated within the application server 708. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing temporary data 712 and general data storage 716. The data store also is shown to include a mechanism for storing alert data 714, which can be used to generate one or more alerts as described above. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), data streams, and other such applications may be generated by server-side structured languages as described herein or may be provided by a content management system ("CMS") operating on, or under the control of, the application server.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

In embodiments utilizing a web server 706, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

References in the specification to aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

APPENDIX

Example Alerts:

| Alert Name | Alert Level | Description |
| --- | --- | --- |
| Substream loses audio data | Error | Most segments in this substream contain audio data, but this segment lacks it. |
| Substream loses video data | Error | Most segments in this substream contain video data, but this segment lacks it. |
| Quality levels do not contain fully overlapping data | Error | Switching from this segment into the specified quality level is impossible as no segments with overlapping times were found. |
| Target duration too low | Error | A segment's measured duration exceeds the manifest's target duration. |
| No PPS | Error | This segment contains no PPS data, therefore no video data will be decoded from it. |
| No SPS | Error | This segment contains no SPS data, therefore no video data will be decoded from it. |
| Exceeded stated bandwidth | Error | This rendition permutation exceeded the specified bandwidth. |
| Download is slower than realtime | Error | This segment was transferred at less than realtime speeds, meaning a player watching it would gradually lose buffer as it played. |
| Download error | Error | Download failure due to a {{type}} error: {{#if code}}{{code}} {{/if}}{{message}}. |
| Extra white space in manifest | Error | (4.1.p2 white space) |
| Invalid line ending characters | Error | (4.1.p2 line feed) |
| Missing EXTM3U tag on first line | Error | (4.3.1.1. first line) |
| Late EXTM3U tag in manifest | Error | (4.3.1.1.) |
| Manifest error | Error | A general occurred while parsing the manifest. {{error}} (Error) |
| Manifest not available | Error | The manifest parser was not able to produce manifest data. |

APPENDIX-continued

Example Alerts:

| Alert Name | Alert Level | Description |
| --- | --- | --- |
| Internal: No root manifest found | Error | No root manifest data found in session. |
| No EXTINF | Error | Segment {{url}} is missing an EXTINF tag. EXTINF is required for each media segment(4.3.2.1.) |
| EXTINF missing duration | Error | EXTINF tag is missing duration, duration is required with the EXTINF tag.(4.3.2.1.) |
| Uses out of order frames | Information | This segment has out of order frame encoding, probably for better efficiency. |
| Mismatched video codec | Information | Segment video codec does not match codec in manifest. |
| Mismatched audio codec | Information | Segment audio codec does not match codec in manifest. |
| VOD manifest | Information | This manifest contains VOD content. |
| Manifest contains empty lines. | Information | This manifest has empty lines. |
| Manifest does not specify version. | Information | This manifest has no EXT-X-VERSION tag, which means that certain features cannot be validated as compliant. |
| Manifest or segment URLs contain query parameters. | Information | This manifest has URLs containing HTTP query parameters. |
| EXTINF tag specifies a title. | Information | This manifest has EXTINF tags containing title information. This may be wasteful of bandwidth if not used. |
| Manifest has empty lines. | Information | Empty lines are allowed by spec. |
| Encrypted stream | Information | This stream is encrypted with AES. Players with limited crypto support (i.e. export capable) will not play it. |
| Stream key has relative URL | Information | This stream's key is specified with a relative URL. |
| Target duration probably too high | Information | The average segment duration was lower than the target duration; it should be adjusted to match segment duration. Grossly incorrect target durations will cause excessive seeking bandwidth consumption. |
| Actual bandwidth | Information | |
| Manifest version: {{version}} | Information | |
| Discontinuity | Information | Substream {{uri}} contains discontinuites. |
| Live | Information | |
| Event | Information | |
| Backup | Information | |
| Video codec: {{coded}} | Information | |
| Audio codec: {{coded}} | Information | |
| Alternate video | Information | |
| Alternate audio | Information | |
| VTT subtitles | Information | |
| CEA subtitles | Information | |
| Manifest - bad content type | Warning | The manifest was served with '{{actual}}' as the content type, but A or B were expected. |
| Manifest - no compression | Warning | It is recommended that all manifests are sent with gzip encoding to save on bandwidth. |
| Manifest redirection | Warning | The server issued a redirect when this file was requested. Some players cannot resolve relative URLs when redirection is present. |
| TS with wrong content type | Warning | The MPEG-TS file was served with '{{actual}}' as the content type, but 'video/mp2t' expected. |
| TS with bad compression | Warning | The MPEG-TS file was served with '{{actual}}' as the compression, but 'identity' expected. |
| Failed to sync TS packet | Warning | No TS Packet sync byte was found following a prior packet. Analyzer had to scan ahead to find the next sync. |
| TS packet failed header validation. | Warning | A TS packet had an invalid length in header. |
| TS segment not fully ordered by DTS. | Warning | PES Packets were found that were not strictly in ascending DTS order. This increases likelihood short buffer scenarios will stall. |
| NALUs contain EPB bytes. | Warning | NALUs in this segment contain EPB bytes. Some players may not interpret these correctly. |

APPENDIX-continued

Example Alerts:

| Alert Name | Alert Level | Description |
|---|---|---|
| Multiple h.264 PPSes found. | Warning | A TS segment should only have a single PPS at the beginning of the segment unless video parameters change. This is a waste of bandwidth. |
| Multiple h.264 SPSes found. | Warning | A TS segment should only have a single SPS at the beginning of the segment unless video parameters change. This is a waste of bandwidth. |
| Segment was shorter than EXTINF duration. | Warning | This can cause extra requests during seeks as the player cannot know the true duration of this segment without requesting it. |
| PPS occurred late in this segment. | Warning | When switching quality levels into this segment, playback of early frames cannot occur due to lack of starting PPS. This may cause picture corruption in some players. |
| SPS occurred late in this segment. | Warning | When switching quality levels into this segment, playback of early frames cannot occur due to lack of starting SPS. This may cause picture corruption in some players. |
| No keyframe at start of segment. | Warning | When switching quality levels into this segment, playback of early frames cannot occur due to lack of a starting keyframe. This may cause picture corruption in some players. |
| Cropped | Warning | Cropping is enabled on this segment. Some h.264 decoders do not honor cropping correctly. |
| Audio gap | Warning | There is a gap in audio PTS between these segments greater than the frame duration of the audio stream. |
| Video gap | Warning | There is a gap in video PTS between these segments greater than the frame duration of the video stream. |
| Audio crowding | Warning | There is overlap in audio data between these segments. |
| Video crowding | Warning | There is overlap in video data between these segments. |
| Corruption likely during quality switch | Warning | Due to the keyframe, SPS, or PPS position, when switching between these segments picture corruption is likely to occur. Even if no corruption occurs, bandwidth is wasted on data that cannot be displayed. |
| Quality levels misaligned (minor) | Warning | The start and end times of these segments mean that switching will result in seeking later into the new segment, wasting bandwidth. |
| Quality levels misaligned (major) | Warning | The start and end times of these segments mean that switching will result in seeking more than 50% late into the new segment, significantly wasting bandwidth. |
| Short segment (<1 second) | Warning | This segment is very short, which may be indicative of inefficient encoding parameters. |
| AVC version specification invalid. | Warning | The manifest specified an invalid AVC codec version. Per spec, AVC codecs should be 6 digit hexadecimal values. |
| Lowercase tags in M3U8 | Warning | Some players with simplistic manifest parsing may fail to detect tags that aren't capitalized per spec. |
| Unknown tag in M3U8 | Warning | Encountered an unknown tag in the M3U8. |
| Media playlist has relative entry URLs. | Warning | Some players (VLC) don't resolve relative entry URLs in media playlist correctly. |
| Manifest has spaces before keys. | Warning | Some players with simplistic manifest parsing may fail to detect tags with leading space. |
| Split Video PES Packets | Warning | This segment splits video frames across multiple PES packets with the same DTS. |
| Split PES packets (video) | Warning | This segment splits video frames across multiple PES packets with the same DTS. |
| Split PES Packets (audio) | Warning | This segment splits audio frames across multiple PES packets with the same DTS. |
| NALUs overflow | Warning | This segment doesn't break NALUs cleanly into PES; instead remnant data from prior |

APPENDIX-continued

Example Alerts:

| Alert Name | Alert Level | Description |
| --- | --- | --- |
| Segment sequence gap | Warning | PES packets must be kept and used in subsequent packets for proper demuxing. There is a gap between this segment's sequence and the previous segment's sequence. Every segment should have its sequence incremented by one. |
| Lowercase tag attribute | Warning | Tag attributes should be in uppercase. |
| Non-terminal end list | Warning | EXT-X-ENDLIST is not the last tag in the playlist |
| Invalid MP4A codec specification | Warning | The specified MP4A coded ({{cdc}}) is invalid. |
| Audio codec change | Warning | Audio codec changed between segments. Expected '{{expected}}' but was '{{actual}}' on {{segmentUrl}}. |
| Video codec change | Warning | Video codec changed between segments. Expected '{{expected}}' but was '{{actual}}' on {{segmentUrl}}. |
| Underran bandwidth | Warning | Bandwidth was {{totalBw}} bits/sec. Expected {{expectedBw}} bits/sec |
| Permutation starts at different times | Warning | There is a different start time between audio and video streams. {{permutation.videoUrl}} and {{permutation.audioURL}} have {{startDist}}ms of delay. |
| Permutation ends at different times | Warning | There is a different end time between audio and video streams. {{permutation.videoUrl}} and {{permutation.audioURL}} have {{startDist}}ms of delay. |
| Mismatched duration in the playlist | Warning | Mismatched duration on URL {{url}}: expected {{expected}} ms, actual {{actual}} ms. |
| Old manifest missing | Warning | |
| Playlist type changed | Warning | Playlist type changed on URL {{url}}: expected {{expected} |
| Invalid sequence ranges | Warning | Old sequence range: {{oldSeqMin}}-{{oldSeqMax} sequence range: {{newSeqMin}}-{{newSeqMax}} |
| Segment beginning sequence decreases | Warning | Old sequence range: {{oldSeqMin}}-{{oldSeqMax}}. New sequence range: {{newSeqMin}}-{{newSeqMax}} |
| Segment trailing sequence decreases | Warning | Old sequence range: {{oldSeqMin}}-{{oldSeqMax}}. New sequence range: {{newSeqMin}}-{{newSeqMax}} |
| Invalid entry: Discontinuity mismatch | Warning | Discontinuity mismatch at sequence {{sequence}}. Old segment URL {{oldUrl}}, discontinuity: {{oldDiscontinuity}}. New segment URL {{newUrl}}, discontinuity {{newDiscontinuity}}. |
| Invalid entry: URL change | Warning | URL change at sequence {{sequence} URL: {{oldUrl}}, new URL: {{newUrl}}. |
| Invalid entry: Tag added | Warning | A new tag {{name}} (with URL: {{newUrl}}) was added to the manifest on line {{newLine}} |
| Invalid entry: Tag value changed | Warning | A {{name}} tag (with URL: {{newUrl}}) value changed on line {{newLine}}. Previous values: {{oldValues}} New values: {{newValues}} |
| Invalid entry: Tag removed | Warning | A {{name}}tag was removed (pointed to URL: {{oldUrl}}) on line {{oldLine}}. |
| Is redirected and relative | Warning | The request to an URL gets redirected and is relative. This can break some clients. |
| Unexpected key size | Warning | Key was expected to be {{actualSize}} bytes long, but is actually {{expectedSize}} bytes long. |
| Internal: No segment | Warning Information | |
| Internal: No manifest entry | Warning | |
| Segment longer than EXTINF definition | Warning | EXTINF defined duration: {{extInfDurationMs}} ms, actual duration {{tsDurationMs}} ms |
| HTTP response missing content type | Warning | |
| EXT-X-ALLOW-CACHE is deprecated | Warning | |

APPENDIX-continued

Example Alerts:

| Alert Name | Alert Level | Description |
| --- | --- | --- |
| Segment exceeds target duration | Warning | Segment {{url}} has expected duration of {{expected}} ms, but is actually {{actual}} ms long. |
| High FPS | Warning | Stream {{url}} has an FPS of {{framerate}}. |
| No codecs | Warning | Stream {{url}} has no codecs defined. |
| Not AES | Warning | Stream {{url}} is encrypted, but is using {{method}} for encryption. Recommended AES-128. |
| No key URI | Warning | Stream {{url}} is encrypted, but doesn't have a key URI defined. |
| EXT-X-BYTERANGE | Warning | Manifest has EXT-X-BYTERANGE defined, which is potentially problematic. |
| Multiple EXTINF | Warning | A stream has multiple EXTINF tags defined. |
| EXTINF invalid values | Warning | An EXTINF has some invalid values: {{value}}(4.3.2.1) |
| Mixed media and master tags | Warning | |
| Referenced wrong group type | Warning | Tag with group ID '{{group}}' references group type '{{type}}', but '{{expectedType}}' is expected. |
| Invalid video group reference | Warning | TODO |
| Invalid audio group reference | Warning | TODO |
| Invalid subtitle group reference | Warning | TODO |
| Discontinuity without sequence root tag | Warning | Substream {{uri}} contains discontinuites without a sequence root tag. |
| Multiple keys | Warning | Multiple keys were present on a manifest. Entry {{entryUrl}} defines a key ({{keyUri}}) after it was already defined |
| No entries | Warning | |
| Missing EXTINF | Warning | Entry {{url}} is missing an EXTINF tag.(4.3.2.1.) |
| Playlist type and end list disagreement | Warning | Playlist is of type {{type}} and {{#ifhasEndList}}has {{else}}doesn't have {{/if}}an end list. |
| Unknown playlist type | Warning | Detected playlist type '{{type}}'. |
| TS never sync | Warning | |
| AAC gap | Warning | |
| Late ADTS | Warning | |
| No ADTS | Warning | |
| PES audio no DTS | Warning | |
| PES audio no PTS | Warning | |
| PES video no DTS | Warning | |
| PES video no PTS | Warning | |
| PES video out of order | Warning | |
| PES audio out of order | Warning | |
| PES video bad DTS order | Warning | |
| PES audio bad DTS order | Warning | |
| PES video very short | Warning | |
| Zero SAR index | Warning | |
| SPS change | Warning | |
| PPS change | Warning | |
| Frames without key frame | Warning | |
| No AUD | Warning | |
| H.264 slices | Warning | |
| DTS bad order | Warning | |
| Exceeded H.264 max FPS | Warning | Average FPS: {{avgFps}} Max FPS: {{maxFps}} |
| Multiple audio tracks | Warning | |
| Multiple video tracks | Warning | |
| Video group default missing | Warning | EXT-X-MEDIA VIDEO group ({{group}}) does not define a default item with DEFAULT = YES. |
| Audio group default missing | Warning | EXT-X-MEDIA AUDIO group ({{group}}) does not define a default item with DEFAULT = YES. |
| Subtitle group default missing | Warning | EXT-X-MEDIA SUBTITLE group ({{group}}) does not define a default item with DEFAULT = YES. |
| Unknown group {{group}} | Warning | Unknown group {{group}} on entry type {{type}}. |
| EXTINF has invalid separators | Warning | EXTINF tag for stream '{{url}}' has invalid separators |
| New manifest missing | Warning | |

APPENDIX-continued

Example Alerts:

| Alert Name | Alert Level | Description |
| --- | --- | --- |
| Sequence number not incremented | Warning | The segments were changed, but the EXT-X-MEDIA-SEQUENCE number was not incremented. |
| Old segments not removed from manifest | Warning | The EXT-X-MEDIA-SEQUENCE number was incremented, but old segments were not removed. |
| Segments updated out of order | Warning | The EXT-X-MEDIA-SEQUENCE number was incremented, but segments were added out of order in the manifest. |
| Segments URLs changed after update | Warning | The EXT-X-MEDIA-SEQUENCE number was incremented, but previously existing segment URLs were changed. |

What is claimed is:

1. An analysis tool for evaluating contents of a data stream formed from a plurality of individual and discrete segments, the tool comprising:
a user interface operable by a user to select a data stream for analysis; and
one or more processors configured to cause the tool to:
fetch the selected data stream by requesting and receiving the plurality of segments that make up the selected data stream from a computer network;
generate a download record for one or more of the plurality of segments that contains data contemporaneously generated at the time the one or more of the plurality of segments are fetched by generating a parsing graph that contains metadata for each parsed layer of each segment and that includes a range map illustrating data flow between the parsed layers, the range map including a source byte range and a destination byte range between two parsed layers;
store the fetched plurality of segments in a data store;
store the download record in the data store associated with the fetched plurality of segments;
retrieve the stored fetched plurality of segments and the download record;
compare the stored fetched plurality of segments and the download record against a ruleset;
generate one or more alerts based on the comparison;
generate a notification of the one or more alerts; and
forward the notification of the one or more alerts to the user.

2. The analysis tool of claim 1, wherein the download record comprises one or more of Hypertext Transport Protocol (HTTP) headers, an outcome of the request, any failure notices caused by the request, whether the request was redirected, and a download event list.

3. The analysis tool of claim 2, wherein the download event list comprises time-stamped event records describing the process of the fetch request.

4. The analysis tool of claim 2, wherein the download event list comprises a date and time of a beginning of the fetch request, a date and time of an end of the fetch request, the overall completion time, and the time from completion until a close of a connection with the computer network.

5. The analysis tool of claim 2, wherein, if the request was redirected, the download event list comprises a date and time of a beginning of each redirected request and a date and time of an end of each redirected request.

6. The analysis tool of claim 1, wherein the processor configured to generate one or more alerts based on the comparison is configured to generate different levels of alerts.

7. The analysis tool of claim 6, wherein levels of alerts include error alerts, warning alerts, and informational alerts.

8. The analysis tool of claim 1, wherein the processor configured to compare the stored fetched plurality of segments and download record against a ruleset is configured to:
ensure each segment in the stored plurality of segments contains audio data; and
generate an error alert when each segment in the stored plurality of segments does not contain audio data.

9. The analysis tool of claim 1, wherein the processor configured to compare the stored fetched plurality of segments and download record against a ruleset is configured to:
ensure the selected stream is encrypted using a preferred encryption method; and
generate a warning alert when the selected stream is not encrypted using the preferred encryption method.

10. A method for evaluating contents of a data stream formed from a plurality of individual and discrete segments, the method comprising:
receiving, from a user, a selected data stream to be analyzed;
fetching the selected data stream by requesting and receiving the plurality of segments that make up the selected data stream from a computer network;
generating a download record for one or more of the plurality of segments that contains data contemporaneously generated at the time the one or more of the plurality of segments are fetched by generating a parsing graph that contains metadata for each parsed layer of each segment and that includes a range map illustrating data flow between an input and an output of the parsed layers, the range map including a source byte range and a destination byte range between two parsed layers;
storing the fetched plurality of segments in a data store;
storing the download record in the data store associated with the fetched plurality of segments;
retrieving the stored fetched plurality of segments and download record;
comparing the stored fetched plurality of segments and download record against a ruleset;
generating one or more alerts based on the comparison;
generating a notification of the one or more alerts; and
forwarding the notification of the one or more alerts to the user.

11. The method according to claim 10, wherein the download record comprises one or more of Hypertext Transport Protocol (HTTP) headers, an outcome of the request, any failure notices caused by the request, whether the request was redirected, and a download event list.

12. The method according to claim 10, wherein the download event list comprises time-stamped event records describing the process of the fetch request.

13. The method according to claim 10, wherein the download event list comprises a date and time of a beginning of the fetch request, a date and time of an end of the fetch request, the overall completion time, and the time from completion until a close of a connection with the computer network.

14. The method according to claim 10, wherein, if the request was redirected, the download event list comprises a date and time of a beginning of each redirected request and a date and time of an end of each redirected request.

15. The method according to claim 10, wherein generating one or more alerts based on the comparison comprises generating different levels of alerts.

16. The method according to claim 10, wherein the different levels of alerts include error alerts, warning alerts, and informational alerts.

17. The method according to claim 10, wherein comparing the stored fetched plurality of segments and download record against a ruleset comprises:
　　ensuring each segment in the stored plurality of segments contains audio data; and
　　generating an error alert when each segment in the stored plurality of segments does not contain audio data.

18. The method according to claim 10, wherein comparing the stored fetched plurality of segments and download record against a ruleset comprises:
　　ensuring the selected stream is encrypted using a preferred encryption method; and
　　generating a warning alert when the selected stream is not encrypted using the preferred encryption method.

\* \* \* \* \*